US008776950B2

(12) United States Patent
Quehenberger et al.

(10) Patent No.: US 8,776,950 B2
(45) Date of Patent: Jul. 15, 2014

(54) TRANSFER CASE ARRANGEMENT

(71) Applicants: Johannes Quehenberger, Saalbach (AT); Walter Hamal, Stallhof (AT)

(72) Inventors: Johannes Quehenberger, Saalbach (AT); Walter Hamal, Stallhof (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 0 days.

(21) Appl. No.: 13/788,721

(22) Filed: Mar. 7, 2013

(65) Prior Publication Data
US 2013/0244830 A1 Sep. 19, 2013

Related U.S. Application Data

(63) Continuation of application No. 12/407,277, filed on Mar. 19, 2009, now abandoned.

(30) Foreign Application Priority Data

Mar. 20, 2008 (DE) .................. 10 2008 015 200

(51) Int. Cl.
F16D 13/74 (2006.01)

(52) U.S. Cl.
USPC .......................................... 184/6.12

(58) Field of Classification Search
USPC .................. 184/6.12; 180/339; 123/196 R
See application file for complete search history.

(56) References Cited

U.S. PATENT DOCUMENTS

| 3,580,350 | A | * | 5/1971 | Arkus-Duntov | 180/248 |
| 4,699,249 | A | * | 10/1987 | Fujiura et al. | 184/11.1 |
| 4,757,870 | A | * | 7/1988 | Torii et al. | 180/233 |
| 4,841,803 | A | * | 6/1989 | Hamano et al. | 74/665 GE |
| 4,896,561 | A | * | 1/1990 | Hayakawa et al. | 74/606 R |
| 4,922,765 | A | * | 5/1990 | Hayakawa et al. | 74/15.88 |
| 5,105,901 | A | * | 4/1992 | Watanabe et al. | 180/249 |
| 5,203,429 | A | * | 4/1993 | Zager | 184/1.5 |
| 5,295,919 | A | * | 3/1994 | Kobayashi | 475/205 |
| 5,704,863 | A | * | 1/1998 | Zalewski et al. | 475/88 |
| 5,839,084 | A | * | 11/1998 | Takasaki et al. | 701/67 |
| 6,041,904 | A | * | 3/2000 | Kuroda et al. | 192/113.34 |
| 6,582,331 | B1 | * | 6/2003 | Baxter, Jr. | 474/91 |
| 6,626,053 | B2 | * | 9/2003 | Baxter et al. | 74/15.86 |
| 6,808,037 | B1 | * | 10/2004 | Mueller | 180/247 |
| 6,964,315 | B2 | * | 11/2005 | Mueller | 180/247 |
| 2007/0056826 | A1 | * | 3/2007 | Burns et al. | 192/70.12 |

* cited by examiner

Primary Examiner — William A Rivera
Assistant Examiner — Michael Riegelman
(74) Attorney, Agent, or Firm — Dickinson Wright PLLC

(57) ABSTRACT

A transfer case arrangement may include a first output shaft, a second output shaft, a clutch, a shutdown device, a lubrication device, and a control. The clutch may distribute a torque between the output shafts. The shutdown device may shut down the second output shaft when the clutch is disengaged. The lubrication device may lubricate the clutch and/or another component of the transfer case arrangement. The lubrication device may include an oil conveying device for conveying lubrication oil. The control may activate the oil conveying device periodically when the second output shaft is shut down.

19 Claims, 1 Drawing Sheet

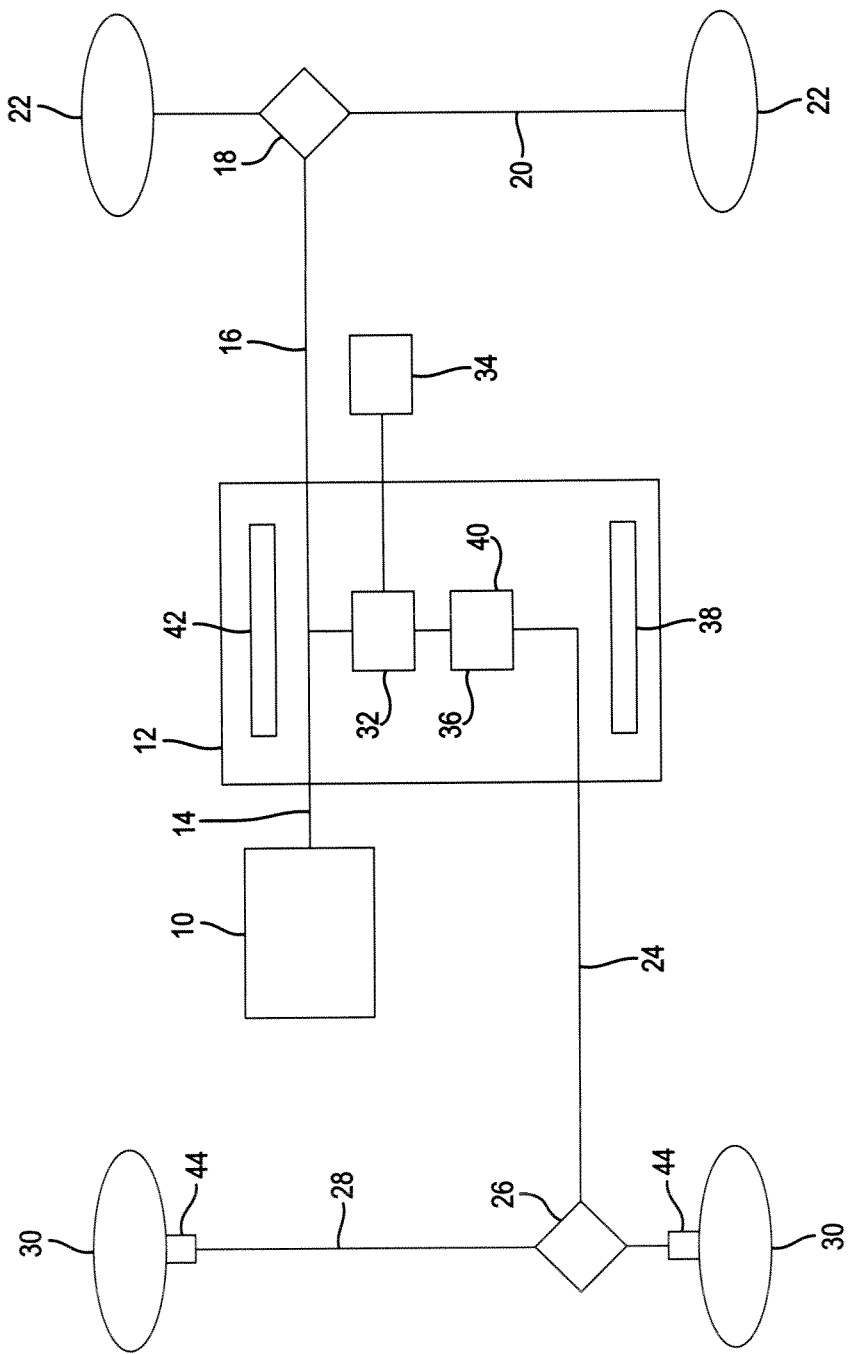

TRANSFER CASE ARRANGEMENT

CROSS-REFERENCE TO RELATED APPLICATIONS

This application is a continuation of U.S. patent application Ser. No. 12/407,277 filed Mar. 19, 2009 which claims the benefit and priority of German Patent Application No. 10 2008 015 200.5 filed Mar. 20, 2008. The entire disclosure of both of the above applications is incorporated herein by reference.

FIELD

The invention relates to a transfer case arrangement having a first output shaft, a second output shaft, a clutch for the distribution of a torque between the output shafts and a shutdown device for the shutting down of the second output shaft when the clutch is disengaged.

BACKGROUND

This section provides background information related to the present disclosure whish is not necessarily prior art.

Such a transfer case arrangement is generally known and is used, for example in a motor vehicle, to permanently drive a vehicle axle, e.g. a rear axle, connected to the first output shaft and to additionally transmit, when required, drive torque via the second output shaft to a second vehicle axle, e.g. a front axle. The first vehicle axle permanently driven by the first output shaft is also called the primary axle, whereas the optionally drivable second vehicle axis is called a secondary axle.

The transmission of drive torque via the second output shaft to the secondary axle takes place by an at least partial engagement of the clutch of the transfer case. When the clutch is disengaged, the second output shaft and consequently also the secondary axle are, in contrast, not loaded with drive torque. To prevent unnecessary moments of inertia and drag losses from being generated in that the second output shaft is set into rotation by vehicle wheels connected to the secondary axle, it is known to provide a shutdown device by which the second output shaft can be shut down in that it is decoupled from the vehicle wheels when the clutch is disengaged.

Known transfer cases typically—independent of whether or not they have a shutdown device for shutting down the second output shaft—have a lubrication device for the lubrication of the clutch and/or of another component, e.g. of a bearing, of the transfer case, the lubrication device having a pump for conveying lubrication oil from an oil sump of the transfer case to the clutch and/or to the other component.

Conventionally, the pump is an electrically driven pump or a pump driven by the first output shaft, for example a gerotor pump, which continuously conveys lubrication oil.

Such pumps result in a deterioration of the efficiency of the transfer case so that pump-less lubrication devices have been developed which convey lubrication oil from the oil sump to the clutch and/or bearings of the transfer case while utilizing a chain drive or a gear connection between the output of the clutch and the second output shaft.

If such pump-less lubrication devices are provided in a transfer case arrangement with a shutdown device, the problem, however, occurs that no lubrication oil is conveyed when the second output shaft is shut down. This impairs the lubrication of the clutch and/or of the bearings of the transfer case and can result in damage to the transfer case at least in the long term.

SUMMARY

It is an object of the invention to provide a transfer case arrangement whose reliable function is permanently ensured.

The transfer case arrangement in accordance with the present disclosure includes a first output shaft, a second output shaft, a clutch for distributing drive torque between the output shafts, a shutdown device for shutting down the second output shaft when the clutch is disengaged, and a lubrication device for lubricating the clutch and/or another component, e.g. a bearing, of the transfer case arrangement, with the lubrication device having an oil conveying device for conveying lubrication oil. A control is furthermore provided which serves to activate the oil conveying device from time to time when the second output shaft is shut down.

Since the control in accordance with the present disclosure provides an activation of the oil conveying device from time to time when the second output shaft is shut down, it is ensured that a quantity of lubrication oil is conveyed which is sufficient for an ideal lubrication of the clutch and/or of the other transmission component even with a shut down second output shaft, for example with a vehicle driven only via the primary axle. Since oil conveyance is typically anyway provided with a driven second drive shaft, a sufficient lubrication of the clutch or of the other transmission component is therefore always ensured and a prerequisite for a long-term reliable function of the transfer case is thus provided.

Since the control provided in accordance with the present disclosure does not provide a continuous oil conveyance when the second output shaft is shut down, but only upon activation of the oil conveying device from time to time, churning losses accompanying the oil flow as well as unwanted moments of inertia, which can occur, for example, when the oil flow is based on a rotation of the second output shaft, are furthermore minimized, which ultimately contributes to a better efficiency of the transfer case arrangement.

In accordance with a first embodiment, the control serves to activate the oil conveying device intermittently, i.e. to repeatedly switch the oil conveying device on and off, with a shut down second output shaft. In this respect, the switching on and off of the oil conveying device may take place at regular or irregular time intervals with the activation or deactivation of the oil conveying device being able to follow a fixedly preset pattern or being able to be carried out in a demand-oriented manner.

The oil conveying device may, in particular, be activated upon braking of the vehicle, e.g. by an engine brake or by a foot brake, since losses accompanying actuation of the oil conveying device, for example drag losses and/or moments of inertia, do not have a disadvantageous effect, but rather an advantageous one. In addition, actuation of the oil conveying device contributes to the heating of the transfer case and/or of an axial differential of the secondary axle, which has an advantageous effect on the efficiency of the transmissions.

The oil conveying device may include an electrically driven pump or a pump driven by the second output shaft, e.g. a gerotor pump. Alternatively, the oil conveying device may be formed by a torque transmission device, such as a chain drive or a gear connection, which is connected between an output of the clutch and the second output shaft.

In the case of an electrically driven pump, activation of the oil conveying device may take place by an activation signal from the control sent to the pump directly.

In the case that the oil conveying device is formed by a pump driven by the second output shaft or by a chain drive or a gear connection likewise driven by the second output shaft, activation of the oil conveying device preferably takes place by an at least partial engagement of the clutch. Some of the drive torque is branched off from the first output shaft to the second output shaft by the at least partial engagement of the clutch, whereby the second output shaft is set into rotation and the oil conveying device is set into motion. The second output shaft shut down per se is in other words therefore temporarily set into rotation for the oil conveying.

In the case that the oil conveying device is formed by a pump driven by the second output shaft or by a chain drive or a gear connection likewise driven by the second output shaft, it proves to be particularly advantageous if the control is made to activate the oil conveying device during a deceleration or a coasting mode of the motor vehicle in which the transfer case arrangement is installed since acceleration of the previously shut down second output shaft can be carried out with particular fuel economy in this manner and ultimately better fuel efficiency is achieved.

The oil conveying device is preferably made so that it conveys lubrication oil from an oil sump of the transfer case into a region of the transfer case disposed above the clutch or above the other component.

Furthermore, the lubrication device may include an oil reservoir for the collection of lubrication oil conveyed by the oil conveying device, and arranged such that an oil level in the oil reservoir is above an outlet opening of a supply line leading from the oil reservoir to the clutch or to the other component. Such an oil reservoir acts as a buffer or intermediate store which ensures that sufficient lubrication oil is also available for lubrication of the clutch or of the other transmission component between two oil conveying procedures. The position of the oil level in the oil reservoir above the outlet opening of the supply line makes it possible that the oil may only flow out of the oil reservoir to the clutch or to the other transmission component due to gravity, i.e. without any additional pumping effect.

The length of an oil conveying procedure and the time interval between two sequential oil conveying procedures are preferably matched to the oil reservoir and/or to the supply line such that an oil level sufficiently high for a reliable lubrication is always ensured in the oil reservoir. Alternatively or additionally, the oil reservoir may have an oil level sensor which detects the level of the oil in the oil reservoir and transmits a corresponding signal to the control when the oil level falls below a critical lower limit and activation of the oil conveying device is required.

In accordance with a further embodiment, the second output shaft functions to transmit drive torque to wheels of a motor vehicle and the shutdown device is connected between the wheels and the second output shaft. The second output shaft may therefore be decoupled from the wheels by the shutdown device to prevent the second output shaft from being set into rotation by the wheels when the clutch of the transfer case is disengaged.

The shutdown device may be arranged directly at the hubs of the wheels. This has the advantage that not only the second output shaft, but rather also the vehicle axle connected thereto for driving the wheels, i.e. the secondary axle, can be decoupled with respect to rotation of the wheels. The shutdown device therefore effects a shutdown not only of the second output shaft, but also of the secondary axle. A shutdown device arranged at the hubs of the wheels may include dog clutches which may be actuated by negative pressure, for example, from a vacuum pump for a brake power assist unit or from an intake restriction of the throttle, or the dog clutches may also be activated electromagnetically.

Alternatively, the shutdown device may be arranged at an axial differential, in particular at an output or at both outputs of the axial differential, of a vehicle axle driving the wheels, in other words that is of the secondary axle. In this case, the shutdown device is connected between the secondary axle and the second output shaft so that only the second output shaft can be shut down, whereas the secondary axle is set into rotation by the wheels with a moving vehicle. A shutdown device of this kind can, for example, be a friction clutch actuated by an electric motor or one or two dog clutches.

The present disclosure also relates to a method for the lubrication of a clutch and/or of another component of a transfer case arrangement. Advantageous embodiments of the method result from the embodiments of the transfer case arrangement in accordance with the disclosure described above.

Further areas of applicability will become apparent from the description provided herein. The description and specific examples in this summary are intended for purposes of illustration only and are not intended to limit the scope of the present disclosure.

DRAWINGS

The drawing described herein is for illustrative purpose only of the selected embodiments and not all possible implementation have been described such that the drawing is not intended to limit the scope of the present disclosure.

FIG. 1 shows a schematic representation of a transfer case arrangement in accordance with the present disclosure.

DETAILED DESCRIPTION

A transfer case arrangement of a motor vehicle which has an engine 10 and a transfer case 12 is shown in FIG. 1. The transfer case 12 includes a drive shaft 14 which is driven by the engine 10 and which is rigidly connected to a first output shaft 16 of the transfer case 12. The combination of drive shaft 14 and first output shaft 16 is also called a main shaft. The transfer case 12 can furthermore optionally have a step-down transmission (not shown) arranged at the first drive shaft 14 for the switching into an off-road gear (hi/lo gear).

The first output shaft 16 is connected via an axial differential 18 to a first vehicle axle 20. The first vehicle axle 20 is driven permanently by the first output shaft 16 so that the first vehicle axle 20 is also called the primary axle. The primary axle 20 serves for driving of a first pair of vehicle wheels 22.

The transfer case 12 furthermore has a second output shaft 24 which is connected via an axial differential 26 to a second vehicle axle 28, the so-called secondary axle, which serves for driving of a second pair of vehicle wheels 30.

In the present embodiment, the primary axle 20 represents a rear axle of the vehicle and the vehicle wheels 22 correspondingly represent rear wheels, while the secondary axle 28 is a front axle and the vehicle wheels 30 are front wheels of the vehicle. Generally, however, the primary axle 20 can also be a front axle and the secondary axle 28 can be a rear axle.

For distributing drive torque of the engine 10 between the first output shaft 16 and the second output shaft 24, the transfer case 12 has a clutch 32 which is connected at its input side to the first output shaft 16 and at its output side to the second output shaft 24. The clutch 32 is a friction clutch, for example a multi-disk clutch, and in particular a wet multi-disk clutch.

The actuation of the clutch 32, that is the engagement state or disengagement state of the clutch 32, is controlled by means of a control 34. The proportion of drive torque which is or can be transmitted via the second output shaft 24 to the front wheels 30 is set by the degree of engagement of the clutch 32.

A chain drive 36 is connected between the output side of the clutch 32 and the second output shaft 24, with a gear connection also being able to be provided instead of the chain drive 36. The chain drive 36 does not only serve for the transmission of torque from the clutch 32 to the second output shaft 24, but it additionally conveys lubrication oil from an oil sump 38 arranged in a lower region of the transfer case 12 into a region of the transfer case 12 disposed above the clutch 32. The chain drive 36 therefore forms an oil conveying device 40 in addition to a torque transmission device.

The lubrication oil conveyed upward by rotation of the chain drive 36 is used to lubricate the clutch 32 as well as other components of the transfer case 12, such as bearings, and is collected in an oil reservoir 42. The lubrication oil conveyed upward is stored in the oil reservoir 42 such that the oil level in the oil reservoir 42 is above an outlet opening of a supply line (not shown) leading from the oil reservoir 42 to the clutch 32 or to the other components of the transfer case 12 so that the lubrication oil can flow to the clutch 32 or to the other transmission components due to gravity.

It must be pointed out that the oil reservoir 42 does not necessarily have to be provided. Instead, it is also possible to supply the lubrication oil conveyed upward by the chain drive 36 directly to the clutch 32 or to the other components of the transfer case 12.

It is easy to understand that the chain drive 36 only acts as an oil conveying device 40 when the second output shaft 24 rotates, i.e. that is when the clutch 32 is at least partially engaged, and/or when the second output shaft 24 is driven by the front wheels 30 with a moving vehicle. Conversely, no oil conveying takes place when the second output shaft 24 is stationary.

To prevent the secondary axle 28 and the second output shaft 24 from being set into motion by the rotating front wheels 30 when the clutch 32 is disengaged, i.e. on a drive of the vehicle exclusively via the primary axle 20, and thus preventing unnecessary moments of inertia from being produced, a shutdown device is provided for shutting down the secondary axle 28 and the second output shaft 24. The shutdown device may include dog clutches 44 arranged at the hubs of the front wheels 30 by which the front wheels 30 may be rotationally decoupled from the secondary axle 28.

Alternatively, the shutdown device may also be arranged at the axial differential 26 of the secondary axle 28. In this case, only the second output shaft 24 would be rotationally decoupled from the front wheels 30, whereas the secondary axle 28 would always rotate together with the front wheels 30.

It has already been mentioned that no lubrication oil is conveyed from the oil sump 38 into the oil reservoir 42 when the secondary output shaft 24 is shut down. However, when the vehicle is only driven via the primary axle 20, there is therefore generally the danger that sufficient lubrication oil may not be available in the oil reservoir 42 for the lubrication of the clutch 32 or the other transmission components.

In order always to store a quantity of lubrication oil in the oil reservoir 42 sufficient for lubrication of the clutch 32 and the other transmission components, or in order also to ensure sufficient lubrication of the clutch 32 and the other transmission components without any oil reservoir 42 present, the control 34 therefore ensures that an oil conveying procedure takes place from time to time with a generally shut down second output shaft 24 in that the control 34 commands an at least partial engagement of the clutch 32 from time to time, whereby the chain drive torque transmission device 36 is actuated and an oil conveying is thus set in motion.

In this respect, the engagement of the clutch 32 from time to time, and thus the length of an oil conveying procedure or the time interval between two sequential oil conveying procedures, can follow a predetermined regular or irregular pattern or can take place in a demand-oriented manner with reference to the oil level in the oil reservoir 42 which can be detected with the help of a suitable oil level sensor or determined with reference to a map or calculation model and transmitted to the control 34. In addition, the clutch 32 may always be engaged when the vehicle is braked, e.g. by a foot brake or by an engine brake.

Finally, it must be pointed out that the oil conveying device 40 for the conveying of lubrication oil from the oil sump 38 into the oil reservoir 42 does not necessarily have to be a chain drive 36 or a corresponding gear connection connected between the clutch 32 and the second output shaft 24, but that the oil conveying device 40 may rather be a separate oil pump. Such an oil pump may, for example, be a gerotor pump which is driven by the second output shaft 24 and which is actuable by an at least partial engagement of the clutch 32 from time to time with a generally shut down second output shaft 24 in accordance with the chain drive 36. Alternatively, the oil pump may, however, also be an electrically driven pump which is activated occasionally by the control 34 or by another suitable control when the output shaft 24 is shut down.

The forgoing description of the embodiments has been provided for purposes of illustration and description. It is not intended to be exhaustive or to limit the invention. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A transfer case arrangement for a motor vehicle having an engine, a first axle driving a pair of first wheels, and a second axle driving a pair of second wheels, the transfer case arrangement comprising:
    a first output shaft transmitting drive torque from the engine to the first axle for driving the first wheels;
    a second output shaft;
    a clutch operable in an engaged mode to couple the second output shaft to the first output shaft and in a disengaged mode to uncouple the second output shaft from the first output shaft;
    a shutdown device operable in a coupled mode to couple the second axle to the second output shaft and in an uncoupled mode to uncouple the second axle from the second output shaft;
    an oil conveying device operable for conveying a lubrication oil from an oil sump to a remote location in proximity to the clutch in response to rotation of the second output shaft; and
    a control operable to automatically shift the clutch from its disengaged mode to its engaged mode periodically while the shutdown device is in its uncoupled mode to cause rotation of the second output shaft and activate the oil conveying device for periodically conveying the lubrication oil from the oil sump to the remote location while the shutdown device is maintained in its uncoupled mode.

2. The transfer case arrangement in accordance with claim 1, wherein the oil conveying device includes a pump driven by the second output shaft.

3. The transfer case arrangement in accordance with claim 1, wherein the oil conveying device is associated with one of a chain drive and a gear drive connected between an output of the clutch and the second output shaft.

4. The transfer case arrangement in accordance with claim 1, wherein activation and deactivation of the oil conveying device takes place by intermittent engagement and disengagement of the clutch, wherein the control acts to shift the clutch between its engaged and disengaged modes on a periodic basis to define a time period for an oil conveying procedure and a time interval between two sequential oil conveying procedures, and wherein the time period and the time interval follow a predetermined regular or irregular pattern based on the automatic control of the clutch.

5. The transfer case arrangement in accordance with claim 1 further including a lubrication device having an oil reservoir for collecting the lubrication oil conveyed by the oil conveying device such that the lubrication oil is able to flow from the oil reservoir to the remote location due to gravity.

6. The transfer case arrangement in accordance with claim 1, wherein the second output shaft transmits torque to the second wheels when the shutdown device is in its coupled mode and functions to connect the second axle to the second output shaft.

7. The transfer case arrangement in accordance with claim 6, wherein the shutdown device is arranged at hubs of the second wheels.

8. The transfer case arrangement in accordance with claim 6, wherein the shutdown device is arranged between a differential associated with the second axle and the second output shaft.

9. The transfer case arrangement in accordance with claim 1, wherein the control activates the oil conveying device during at least one of a deceleration mode and a coasting mode of the motor vehicle.

10. A transfer case for a motor vehicle having an engine and first and second axles, the transfer case comprising:
a first shaft operable to selectively transmit drive torque from the engine to the first axle for driving a set of first wheels;
a second shaft operable to selectively transmit drive torque to the second axle for driving a set of second wheels;
a clutch operable in an engaged mode to transmit drive torque from said first shaft to said second shaft and in a released mode to prevent the transmission of drive torque from said first shaft to said second shaft;
a shutdown device operable in an engaged mode to couple said set of second wheels for rotation with said second shaft and in a released mode to uncouple said set of second wheels from said second shaft;
an oil conveying device operable to convey a lubricating fluid from a sump to a remote location in response to rotation of said second shaft; and
a control operable to automatically shift said clutch between its engaged mode and its disengaged mode on an intermittent basis when said shutdown device is maintained in its released mode to provide automatic and periodic activation of said oil conveying device for conveying said lubricating fluid from said oil sump to said remote location.

11. The transfer case of claim 10 wherein said clutch includes an input component driven by said first shaft, an output component, and a clutch pack disposed between said input and output components, and wherein said oil conveying device includes a torque transmission mechanism interconnecting said output component of said clutch to said second shaft.

12. The transfer case of claim 11 wherein said torque transmission mechanism is a chain drive unit operable for conveying said lubricating fluid from said sump to said remote location in response to rotation of said output component of said clutch when said clutch is shifted into its engaged mode.

13. The transfer case of claim 10 wherein said oil conveying device further includes a fluid pump operable to pump said lubricating fluid from said sump to said remote location in response to rotation of said second shaft.

14. The transfer case of claim 10 wherein said shutdown device is arranged to selectively couple and uncouple said set of second wheels from the second axle such that said second wheels are permitted to rotate independently of said second shaft when said shutdown device is in its released mode.

15. The transfer case of claim 10 wherein the second axle includes a differential interconnecting said shaft to said set of second wheels, and wherein said shutdown device is operable for selectively coupling and uncoupling said differential for rotation with said set of second wheels.

16. The transfer case of claim 10 wherein said remote location is an oil reservoir provided for collecting said lubricating oil conveyed by said oil conveying device and which supplies said lubricating oil to components requiring lubrication.

17. The transfer case of claim 10 wherein said clutch is shifted into its engaged mode when said shutdown device is in its released mode and the vehicle is braked to deliver said lubricating oil from said sump to said remote location.

18. The transfer case arrangement of claim 10 wherein said control engages said clutch in response to a predetermined level of oil in an oil reservoir and said shutdown device is in its released mode.

19. A transfer case arrangement for a motor vehicle having an engine, a first axle driving a set of first wheels, and a second axle driving a set of second wheels, the transfer case arrangement comprising:
a first output shaft operable for transmitting drive torque from the engine to the first axle for driving the first wheels;
a second output shaft;
a shutdown device operable in a coupled mode to couple the second output shaft to the second axle and in an uncoupled mode to decouple the second output shaft from the second axle;
a clutch operable in an engaged mode to couple the second output shaft for rotation with the first output shaft and in a released mode to uncouple the second output shaft from the first output shaft;
an oil conveying device operable for conveying lubrication oil from a sump to a remote location in response to rotation of the second output shaft; and
a control for controlling actuation of the clutch when the shutdown device is in its coupled mode to transmit drive torque from the first output shaft to the second output shaft for driving the second wheels, the control further operable to automatically actuate the clutch on an intermittent basis when the shutdown device is maintained in its uncoupled mode to concurrently periodically activate the oil conveying device for conveying lubrication oil from the sump to the remote location without transmitting drive torque through the second axle to the second wheels.

* * * * *